Dec. 17, 1946.   M. BERLINER   2,412,797
METHOD OF MACHINING METAL
Filed Feb. 28, 1945
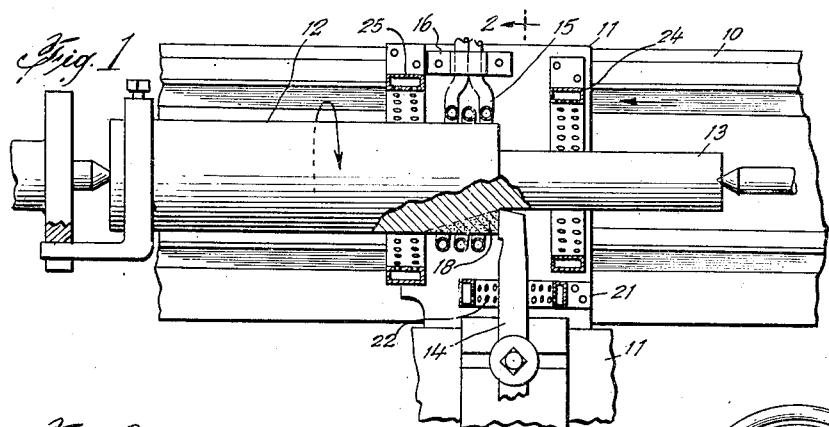
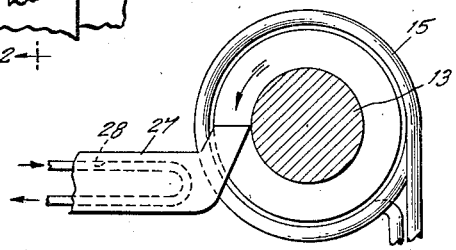
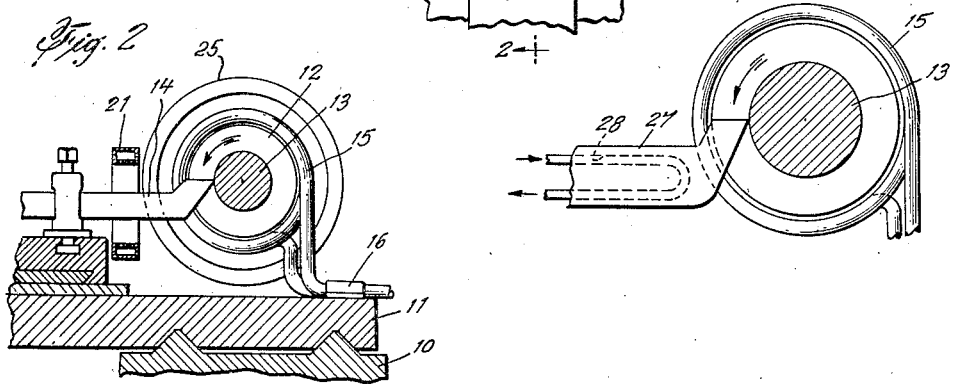
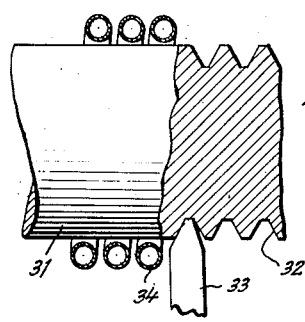
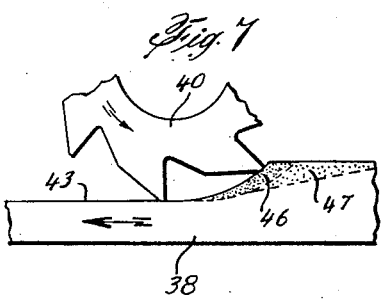
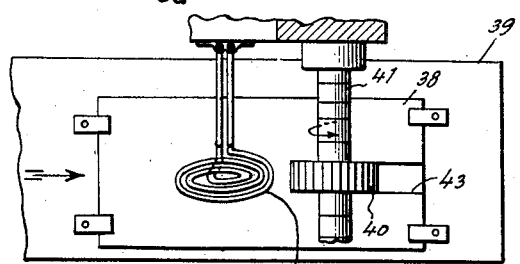
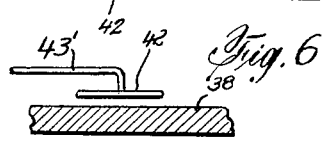
INVENTOR.
Martin Berliner
BY John P. Chandler
his Attorney Patented Dec. 17, 1946

2,412,797

UNITED STATES PATENT OFFICE 2,412,797

METHOD OF MACHINING METAL

Martin Berliner, New York, N. Y., assignor of fifty per cent to Richard I. N. Weingart, New York, N. Y.

Application February 28, 1945, Serial No. 580,201

3 Claims. (Cl. 219—1)

This invention relates to an improved method of machining metals, and relates more particularly to a novel process for greatly increasing the speed at which desired portions may be removed from the main body of the metal by means of a cutting tool. The method of the present invention is applicable to turning, milling, planing, boring, broaching, or otherwise shaping metal.

In the machining of shafts, bushings, and other articles of circular cross-sectional contour on a lathe, it has been the practice to cool the work and the cutting tool by flowing oil or other fluid coolant media upon the work adjacent the point of contact between the work and the tool. This prevents overheating of the work, and also preserves the life of the cutting edge of the tool. The same procedure is followed in other metal-shaping operations where the tool or the work reciprocates, and one member is fed relative to the other.

In following the method of the present invention, the metal, instead of being cooled by a fluid coolant during the cutting operation, is heated to a relatively high temperature, the heating, however, being localized to the particular portion of the work which at, or about, that instant is being cut. In practicing this method it is, of course, necessary to use a cutting tool which is unaffected by these high temperatures, which, of course, may vary, but in general should be a few hundred degrees below the melting point of the metal. A number of materials of this general character are commercially available.

If, for instance, in the process of machining a shaft, it is necessary to take off one-quarter inch of metal for a length of six inches, the common practice would be to mount the shaft in the lathe chuck and cause the tool to cut 10 or 20 thousandths of an inch for such length, and then repeat the operation until the one-quarter inch has been removed. In accordance with the method of the present invention, the entire quarter inch could be machined from the shaft in a single operation. In some instances, particularly in facing operations, the entire quarter inch could be removed at one time in accordance with existing practices. The cutting, however, would proceed extremely slowly.

The heating medium employed in carrying out the method of the present invention may be a high-frequency induction coil, and it is essential in successfully carrying out the present method that the heating be sufficiently localized as to heat only that portion which is immediately thereafter being cut from the metal. The depth and width of heating can be rather accurately controlled by the induction heating method, and if the portion heated is immediately thereafter removed by the cutting tool, the transfer of heat to portions of the metal not required to be cut is relatively small, thus eliminating the possibility of the heat affecting the metallurgical properties of the remaining part of the metal.

When an article is machined on a lathe in the usual fashion, there is, of course, a tremendous pressure between the cutting tool and the metal. This quite naturally develops an enormous amount of heat due to the friction between the tool and the chips, and the tool and the work. Merchant points out in his paper on "Basic mechanics of the metal-cutting process" that "the total work done in cutting is equal to the sum of the work done in shearing the metal and the work done in overcoming friction between tool and chip" (Journal of Applied Mechanics, September, 1944, Page A–172). In other words, the cutting tool does two things; it tears the chips off the metal, and it generates heat due to friction and to the process of forming chips.

By heating the metal through other means, such as by the use of a high-frequency induction heating coil, and presenting the hot metal to the cutting tool, the major part of the work of the cutting tool is directed to cutting and not to heating. The results obtained are remarkable and most unexpected. Fragmentary metal chips are not formed during the operation, and chatter is reduced to a minimum. Continuous ductile ribbons are cut from the metal, and they are cut with almost the same ease as a ribbon could be cut from some soft malleable metal like lead.

By heating the metal in the manner herein described, the metal is softened and the shear strength reduced sufficiently to give the metal a plastic character which eliminates chip formation in the generally accepted sense.

Representative ways of practicing the invention are hereinafter described with reference to the drawing accompanying and forming a part of this specification, the novel features of the invention being set forth in the claims appended hereto.

In the drawing:

Fig. 1 is a schematic view of the bed of a lathe, the view illustrating the method of the present invention in connection with lathe work.

Fig. 2 is a broken vertical section taken on line 2—2 of Fig. 1.

Fig. 3 illustrates a modification in the system wherein the cutting tool is cooled by some fluid medium.

Fig. 4 illustrates the method of the present invention as applied to thread cutting.

Fig. 5 is a plan view illustrating the method of the present invention in connection with a milling operation.

Fig. 6 is a broken vertical section showing the relation of the heating coil, and particularly the terminals thereof, to the work.

Fig. 7 is a sectional view further illustrating the milling operation and showing the path generated by a milling cutter tooth.

Referring particularly to Figs. 1 and 2, the numeral 10 denotes the bed of the lathe, and the numeral 11, the carriage which is appropriately moved by a lead screw (not shown). The work 12 is suitably mounted in the lathe, and has a portion 13 of reduced diameter, which, it will be assumed, has been cut by the cutting tool 14. A high-frequency induction coil 15 having a plurality of turns is appropriately mounted on the carriage, as shown at 16. The internal diameter of the coil is such as to clear the work. It will also be noted that each convolution is disposed slightly at an angle to a plane of rotation of the work.

The triangular portion 18 shown in Fig. 1 represents the portion of the work which has been heated by the coil. As the cutting tool and the coil move relative to the work, this generally triangular area likewise progressively moves, and it will be apparent that the heat is not conducted to the central portion of the work for the reason that the metal is removed as rapidly as it is heated to the full depth illustrated in Fig. 1. Some heat, of course, will be transferred to the central portion, but in view of the arrangement shown the amount will be relatively small. If desired, the cutting tool 14 may be cooled by a circular tube 21 having holes 22 on its inner surface through which water or other fluid cooling medium may pass. Likewise, the work may be cooled by means of similarly-shaped coils 24 and 25 mounted on the carriage concentric with the work.

In the showing of Fig. 3, the cutting tool 27 is formed with a continuous channel 28 through which the cooling medium may pass.

Fig. 4 illustrates the method of the present invention in connection with thread cutting operations. The invention is particularly important in connection with cutting a thread on a lead screw of relatively great length, since in accordance with existing practices it is necessary to take very small cuts on account of the torque caused by the pressure of the tool against the work. By following the method of the present invention, the metal is softened and rendered more plastic and ductile, and the pressure of the tool is necessarily reduced, and an accurate thread of uniform lead can be formed with fewer cuts. In some instances, a single cut may suffice. In this case, the work 31 has at one end thereof the threads 32 which have already been cut by the cutting tool 33. The induction coil 34 is mounted concentrically of the work and is moved progressively with the cutting tool 33.

Figs. 5 and 6 illustrate the method of the present invention as applied to milling operations. In this instance, the work 38 is mounted on carriage 39, and the milling cutter 40 is carried on revolving shaft 41. The induction tube 42 is of elongated formation and is of a width substantially equal to that of the slot 43 which is being cut. If desired, the width of the induction coil can be less than the width of the slot. Fig. 6 illustrates the fact that the terminals 43' of the coil 42 should be spaced further from the work than the main body of the coil.

From an examination of Fig. 7 it will be appreciated that the depth of heating may, if desired, be less than the depth of the slot which is cut. 46 designates the path generated by the milling cutter. Since the work is moving in the direction of the arrow, the tooth cuts a tapered chip corresponding generally to the shape of area 46. Area 47 designates the heated portion.

In the several ways in which the present invention may be practiced which have been illustrated herein, both the tool and the work move. It is not always necessary that in all instances both the tool and the work move, but only that they move relative to each other, as defined by the appended claims.

It will be appreciated from the foregoing that by employing the method and the apparatus of the present invention, the metal is very readily cut from the piece, the wear on the tool is reduced to a minimum, and the remaining surface of the metal is relatively smooth and requires no additional machining to give a finished, polished surface.

What I claim is:

1. The method of machining metal to shape through the use of a cutting tool wherein the metal and the tool move relative to each other, which method consists in applying localized heating to the metal by the use of a high-frequency induction coil, and then cutting away the portion so heated with the cutting tool before the heat is able to travel substantially to other parts of the metal.

2. The method of machining metal to shape which consists in the steps of applying progressive, localized heating by the use of a high-frequency induction coil to the area to be removed, and progressively removing the metal so heated by the use of a cutting tool which changes position relative to the work.

3. In the art of machining metal to shape by the use of a lathe and cutting tool associated therewith, the method which consists in applying localized heating to that portion of the work to be removed in advance of the cutting operation, the localized heating being applied by the use of a high-frequency induction coil which progressively raises the temperature in such areas to a temperature below the melting point of the metal, and then removing the metal by the cutting tool before the heat is substantially conducted to areas not being removed.

MARTIN BERLINER.